(12) United States Patent
Tsai

(10) Patent No.: US 12,455,153 B2
(45) Date of Patent: Oct. 28, 2025

(54) TAPE STRUCTURE

(71) Applicant: Chang-Yu Tsai, Taichung (TW)

(72) Inventor: Chang-Yu Tsai, Taichung (TW)

( * ) Notice: Subject to any disclaimer, the term of this patent is extended or adjusted under 35 U.S.C. 154(b) by 401 days.

(21) Appl. No.: 18/334,484

(22) Filed: Jun. 14, 2023

(65) Prior Publication Data

US 2024/0418490 A1  Dec. 19, 2024

(51) Int. Cl.
*G01B 3/10* (2020.01)
*G01B 3/1003* (2020.01)
*G01B 3/1056* (2020.01)

(52) U.S. Cl.
CPC .......... *G01B 3/1003* (2020.01); *G01B 3/1056* (2013.01); *G01B 2003/1058* (2013.01)

(58) Field of Classification Search
CPC .............................. G01B 3/1003; G01B 3/1056
USPC ..................................................... 33/758, 770
See application file for complete search history.

(56) References Cited

U.S. PATENT DOCUMENTS

| | | | | |
|---|---|---|---|---|
| 5,077,911 A | * | 1/1992 | von Wedemeyer | G01B 3/1056 D10/74 |
| 5,894,677 A | * | 4/1999 | Hoffman | G01B 3/1056 33/759 |
| 6,568,099 B2 | * | 5/2003 | Bergeron | G01B 3/1071 33/758 |
| 8,601,710 B2 | * | 12/2013 | Huang | G01B 3/1056 33/768 |
| 9,322,628 B2 | * | 4/2016 | Burch | G01B 3/1056 |
| 10,545,013 B2 | | 1/2020 | Tsai et al. | |
| 2004/0211080 A1 | * | 10/2004 | Lin | G01B 3/1056 33/758 |
| 2020/0263969 A1 | * | 8/2020 | Zirbes | G01B 3/1056 |
| 2020/0333123 A1 | * | 10/2020 | Bridges | G01B 3/1056 |
| 2024/0118067 A1 | * | 4/2024 | Cawley | G01B 3/1056 |
| 2025/0020442 A1 | * | 1/2025 | Meeks | G01B 3/1056 |

FOREIGN PATENT DOCUMENTS

EP        0442051 A1 * 8/1991 ........... G01B 3/1056

* cited by examiner

*Primary Examiner* — George B Bennett
(74) *Attorney, Agent, or Firm* — LANWAY IPR SERVICES; Chun-Ming Shih

(57) ABSTRACT

A tape structure includes a first body, a first laser body, and a second laser body. The first body is provided with a stop portion, a first surface, a second surface, and multiple grooves. The first laser body is provided on the first surface and includes multiple laser lines distributed on the first surface. The first surface forms a first friction face. The second laser body is provided on the second surface and includes multiple laser lines distributed on the second surface. The second surface forms a second friction face. The stop portion is provided with the first laser body and the second laser body and formed with the first friction face and the second friction face. The first laser body and the second laser body are formed by the laser process.

7 Claims, 5 Drawing Sheets

TAPE STRUCTURE

BACKGROUND OF THE INVENTION

Field of the Invention

The present invention relates to a tape and, more particularly, to a tape structure with an enhanced contact friction.

Description of the Related Art

A conventional measuring tape assembly in accordance with the prior art shown in FIG. 6 comprises a case 42, a tape 40, and an end hook 41. The tape 40 is pulled from or retracted into the case 42. The end hook 41 is mounted on an end of the tape 40. The end hook 41 rests on an object to be measured, to prevent the tape 40 from being detached from the object. However, the end hook 41 does not provide a friction so that the end hook 41 easily slips from the object during measurement. In addition, when the user's finger pulls the end hook 41, the end hook 41 easily slips from the user's finger due to the flat face of the end hook 41.

Another conventional measuring tape assembly was disclosed in the applicant's U.S. Pat. No. 10,545,013, and comprises an end hook. The end hook includes a first face and a second face. The first face has a first sand portion forming a first friction face. The second face has a second sand portion forming a second friction face. The first friction face and the second friction face provide friction so that the end hook does not slip from the object to be measured.

BRIEF SUMMARY OF THE INVENTION

In accordance with the present invention, there is provided a tape structure comprising a first body, a first laser body, and a second laser body. The first body is provided with a stop portion, a first surface, a second surface, and multiple grooves. The first laser body is provided on the first surface and includes multiple laser lines distributed on the first surface. The first surface distributed with the first laser body forms a first friction face. The second laser body is provided on the second surface and includes multiple laser lines distributed on the second surface. The second surface distributed with the second laser body forms a second friction face. The stop portion is provided with the first laser body and the second laser body and formed with the first friction face and the second friction face. The first laser body and the second laser body are formed by the laser process.

According to the primary advantages of the present invention, when the tape structure is placed on the measured object, the first surface rests on the measured object. Thus, the first friction face increases the contact friction force between the first surface of the stop portion and the measured object to prevent the stop portion from slipping from the measured object. In addition, when the user's hand pulls the stop portion, a friction force is produced between the user's hand and the stop portion, to prevent the stop portion 11 from slipping from the user's hand.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
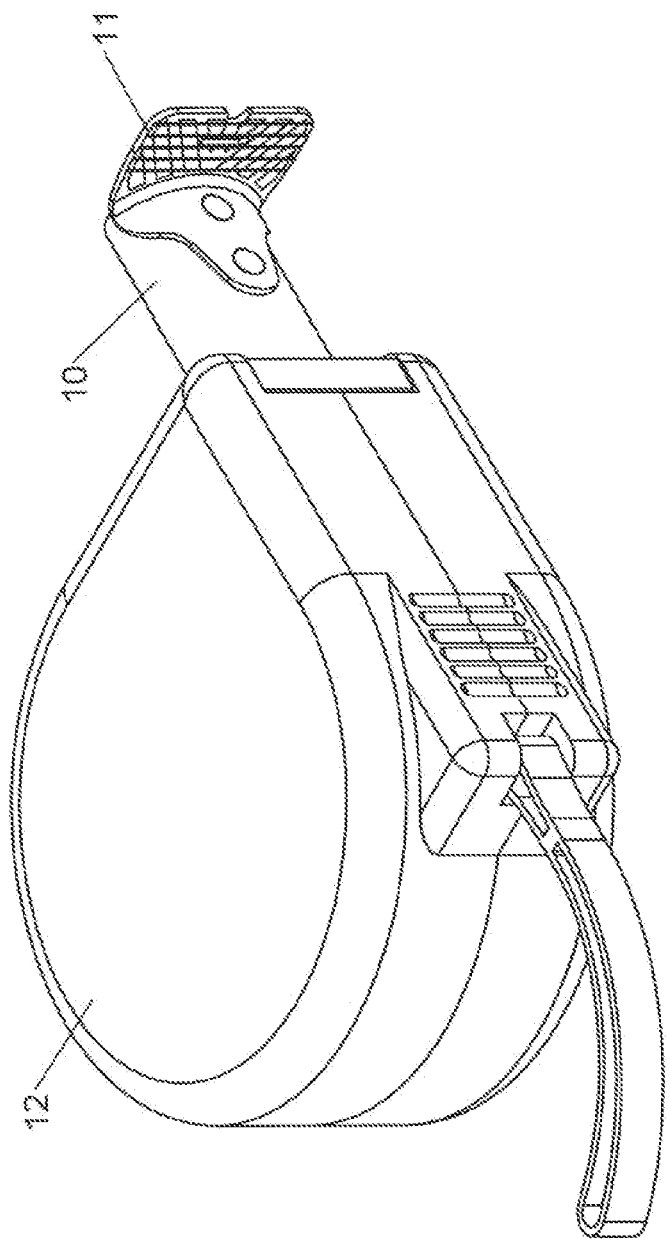
FIG. 1 is a perspective view of a tape structure in accordance with the first preferred embodiment of the present invention.
Figure 3:
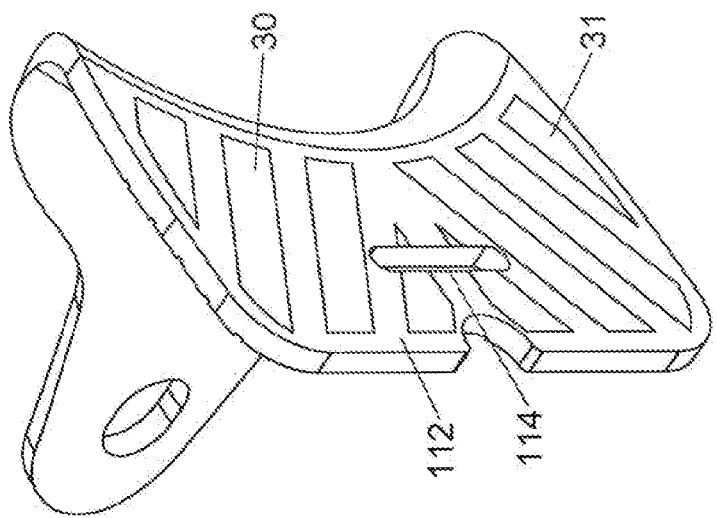
FIG. 3 is another perspective view of the stop portion of the tape structure in accordance with the first preferred embodiment of the present invention.
Figure 2:
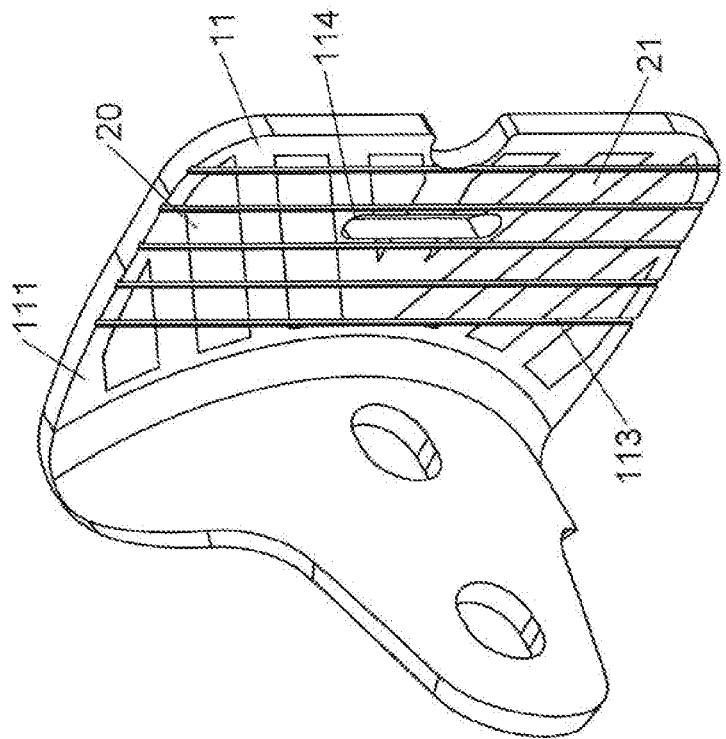
FIG. 2 is a perspective view of a stop portion of the tape structure in accordance with the first preferred embodiment of the present invention.

Referring to the drawings and initially to FIGS. 1-3, a tape structure in accordance with the preferred embodiment of the present invention comprises a first body (or tape) 10, a second body (or case) 12, a first laser body 20, and a second laser body 30.

The first body 10 is a tape measure (or measuring tape). The first body 10 has an end provided with a stop portion (or hook) 11. A measured object rests on the stop portion 11. The stop portion 11 is provided with a first surface 111 facing the first body 10. The first surface 111 is provided on an end face of the stop portion 11. The stop portion 11 is provided with a second surface 112 opposite to the first surface 111. The first surface 111 is provided with multiple grooves 113. The grooves 113 are arranged linearly or annularly or in a dotted shape. The stop portion 11 is provided with at least one slot 114. The at least one slot 114 penetrates the first surface 111 and the second surface 112. The at least one slot 114 has an elongate shape.

The first body 10 is made of resilient material. The stop portion 11 is made of hard material. The stop portion 11 is a single element. The stop portion 11 is assembled to the first body 10 by an anchor or a nail or a rivet.

The second body 12 has an interior provided with a receiving space for receiving the first body 10. The stop portion 11 is moved to rest on a side of the second body 12. The stop portion 11 protrudes from the second body 12. The first body 10 is pulled outward from or retracted into the second body 12.

The first laser body 20 is provided on the first surface 111 and includes multiple laser lines distributed on the first surface 111. The first surface 111 distributed with the first laser body 20 forms a first friction face 21. The first friction face 21 increases a friction force between the first surface 111 and the measured object when the first surface 111 touches the measured object, to prevent the stop portion 11 from slipping from the measured object.

The second laser body 30 is provided on the second surface 112 and includes multiple laser lines distributed on the second surface 112. The second surface 112 distributed with the second laser body 30 forms a second friction face 31. The second friction face 31 increases a friction force between the first surface 111 and the measured object when the first surface 111 touches the measured object, to prevent the stop portion 11 from slipping from the measured object.

The first laser body 20 on the first surface 111 and the second laser body 30 on the second surface 112 are identical or different. The first laser body 20 and the second laser body 30 are made identical or different by features of a laser process, including peeling, coloring, concentration, carbonized particles, grinding material, binding agent, or shapes.

The laser process includes diverse methods and cannot not be described in detail. The stop portion 11 is provided with the first laser body 20 and the second laser body 30 and formed with the first friction face 21 and the second friction face 31. The first laser body 20 and the second laser body 30 are formed by the laser process.

The first laser body 20 and the second laser body 30 are provided on the stop portion 11. The first laser body 20 and the second laser body 30 are formed on a whole surface or a partial surface of the stop portion 11 by a working machine during a laser process. A laser light is applied on the stop portion 11. The whole surface or partial surface of the stop portion 11 is provided with the first friction face 21 and the second friction face 31 which are formed by the laser process, including peeling, coloring, concentration, or carbonization. Each of the first friction face 21 and the second friction face 31 is a rough surface with particles. The first friction face 21 and the second friction face 31 increase a contact friction force between the stop portion 11 and the workpiece to prevent the workpiece from slipping from the stop portion 11.

The first laser body 20 and the second laser body 30 are provided on the stop portion 11 and formed with the first friction face 21 and the second friction face 31. The first friction face 21 covers at least one third (⅓) of the first surface 111. The second friction face 31 covers at least one third (⅓) of the second surface 112.

When the first friction face 21 is provided on the first surface 111, the first laser body 20 includes multiple first friction faces 21, and the first friction faces 21 are distributed on the first surface 111. When the second friction face 31 is provided on the second surface 112, the second laser body 30 includes multiple second friction faces 31, and the second friction faces 31 are distributed on the second surface 112.

When the first friction face 21 is provided on the first surface 111, the first laser body 20 includes multiple first friction faces 21, and the first friction faces 21 are arranged obliquely relative to the stop portion 11. An angle of ten degrees (10°) to seventy degrees (70°) is defined between each of the first friction faces 21 and a side of the stop portion 11. The angle has an optimum value of forty-five degrees (45°).

When the second friction face 31 is provided on the second surface 112, the second laser body 30 includes multiple second friction faces 31, and the second friction faces 31 are arranged obliquely relative to the stop portion 11. An angle of ten degrees (10°) to seventy degrees (70°) is defined between each of the second friction faces 31 and a side of the stop portion 11. The angle has an optimum value of forty-five degrees (45°).

The first friction faces 21 are arranged linearly relative to the stop portion 11. Thus, the first friction faces 21 and the stop portion 11 are parallel with each other. Alternatively, the first friction faces 21 are arranged transversely relative to the stop portion 11.

Figure 4:
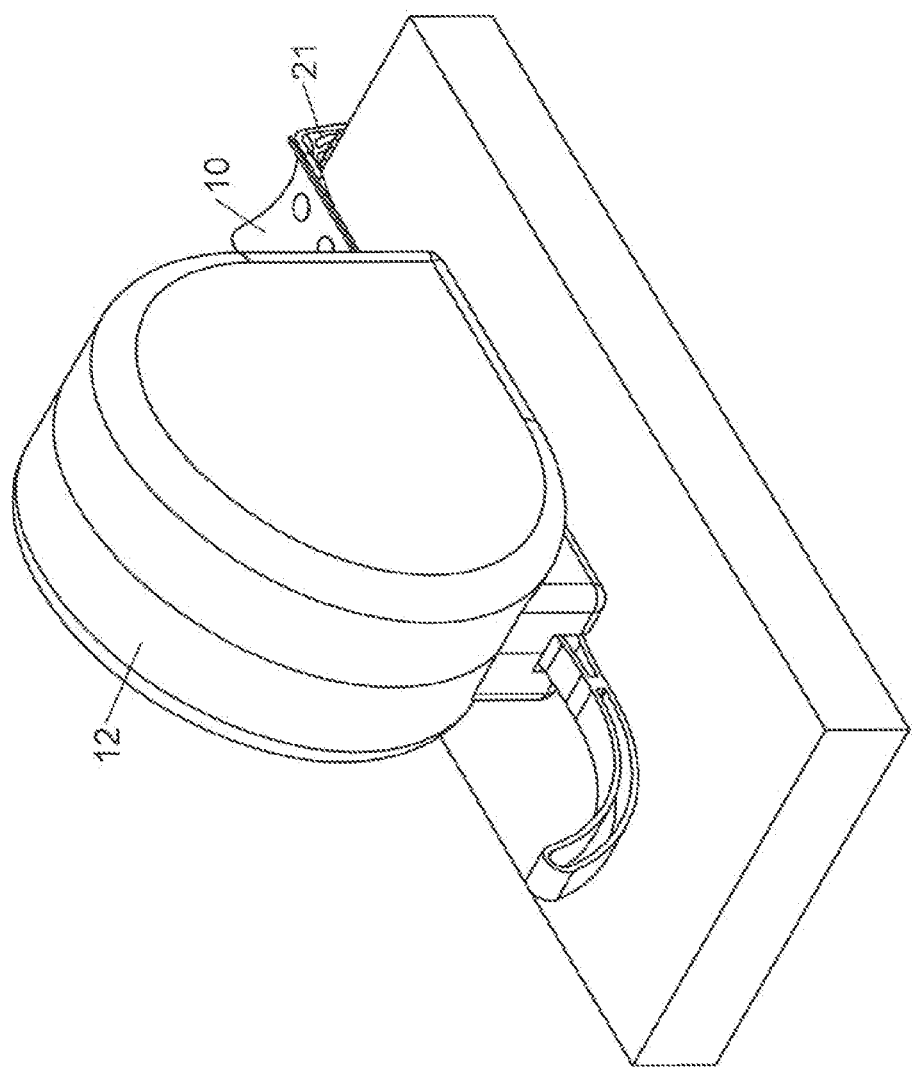
FIG. 4 is a schematic operational view of the tape structure as shown in FIG. 1.

Referring to FIG. 4 with reference to FIGS. 1-3, when the tape structure is placed on the measured object or article, the first surface 111 rests on an end portion of the measured object. The first friction face 21 increases the contact friction force between the first surface 111 of the stop portion 11 and the measured object to prevent the stop portion 11 from slipping from the measured object.

Figure 5:
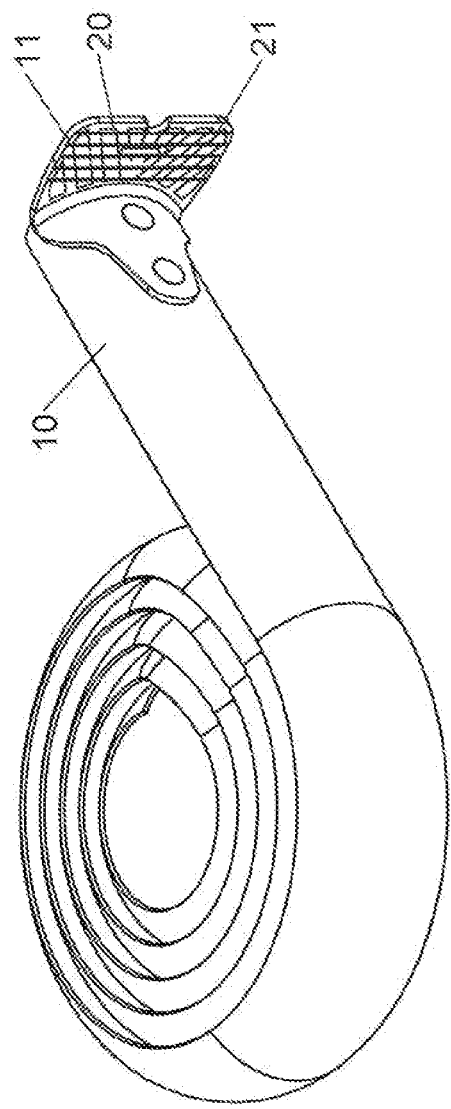
FIG. 5 is a perspective view of a tape structure in accordance with the second preferred embodiment of the present invention.
Figure 6:
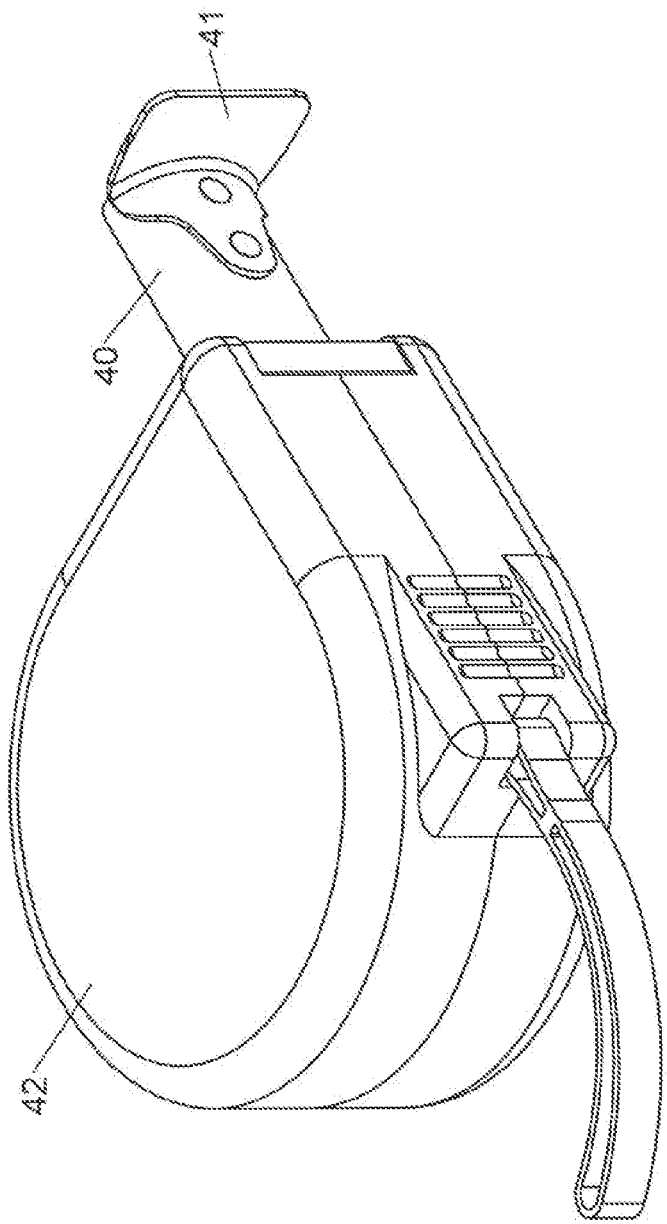
FIG. 6 is a perspective view of a conventional tape structure in accordance with the prior art.

Referring to FIG. 5, the second body 12 is undefined, and the first body 10 is a rewindable resilient tape structure, including a tape, a cloth tape, a ruler or the like.

In accordance with another preferred embodiment of the present invention, the second surface 112 is also provided with multiple grooves 113.

In accordance with another preferred embodiment of the present invention, the first laser body 20 is provided with colors, patterns, stripes, grains, trademarks, characters or figures, to enhance identification of the stop portion 11. Similarly, the second laser body 30 is also provided with colors, patterns, stripes, grains, trademarks, characters or figures, to enhance identification of the stop portion 11. The first laser body 20 and the second laser body 30 are made by a machine which presets a path of the first laser body 20 and the second laser body 30, so that the first laser body 20 and the second laser body 30 are provided with various figures.

Accordingly, the tape structure of the present invention has the following advantages.

1. Referring to FIG. 4, when the tape structure is placed on the measured object, the first surface 111 rests on the measured object. Thus, the first friction face 21 increases the contact friction force between the first surface 111 of the stop portion 11 and the measured object to prevent the stop portion 11 from slipping from the measured object.

2. When the user's hand pulls the stop portion 11, a friction force is produced between the user's hand and the stop portion 11, to prevent the stop portion 11 from slipping from the user's hand.

3. When the stop portion 11 contacts an oily liquid, such as engine oil, lubricating oil, etc., on the workplace, the stop portion 11 easily slips from the workpiece, thereby causing inconvenience to the user. The first laser body 20 and the second laser body 30 overcome this shortcoming. The first friction face 21 and the second friction face 31 are made by the laser process and provides an anti-slip function to increase the friction resistance of the stop portion 11 during measurement.

4. The stop portion 11 is provided with the first laser body 20, and the first surface 111 is provided with the first friction face 21, so that the tape structure increases the friction force to prevent from incurring slip during measurement.

5. The first surface 111 is provided with multiple grooves 113 that provide friction resistance.

6. When the second surface 112 rests on the measured object, the second friction face 31 increases the contact friction force between the second surface 112 of the stop portion 11 and the measured object to prevent the stop portion 11 from slipping from the measured object.

7. The first laser body 20 and the second laser body 30 are provided with colors, patterns, stripes, grains, trademarks, characters or figures, to enhance identification of the stop portion 11.

8. The first laser body 20 and the second laser body 30 are made by a conventional manufacturing method which is mature and inexpensive, to decrease the cost of production when the first surface 111 is provided with the first laser body 20 or when the second surface 112 is provided with the second laser body 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A tape structure comprising:
a first body, a first laser body, and a second laser body;
wherein:

the first body has an end provided with a stop portion;
a measured object rests on the stop portion;
the stop portion is provided with a first surface facing the first body;
the first surface is provided on an end face of the stop portion;
the stop portion is provided with a second surface opposite to the first surface;
the first surface is provided with multiple grooves;
the first body is made of resilient material;
the stop portion is made of hard material;
the stop portion is a single element;
the stop portion is assembled to the first body;
the first laser body is provided on the first surface and includes multiple laser lines distributed on the first surface;
the first surface distributed with the first laser body forms a first friction face;
the first friction face increases a friction force between the first surface and the measured object when the first surface touches the measured object, to prevent the stop portion from slipping from the measured object;
the second laser body is provided on the second surface and includes multiple laser lines distributed on the second surface;
the second surface distributed with the second laser body forms a second friction face;
the second friction face increases a friction force between the first surface and the measured object when the first surface touches the measured object, to prevent the stop portion from slipping from the measured object;
the first laser body on the first surface and the second laser body on the second surface are identical or different;
the first laser body and the second laser body are made identical or different by features of a laser process;
the stop portion is provided with the first laser body and the second laser body and formed with the first friction face and the second friction face;
the first laser body and the second laser body are formed by the laser process;
the first laser body and the second laser body are provided on the stop portion;
the first laser body and the second laser body are formed on a whole surface or a partial surface of the stop portion by a working machine during a laser process;
the whole surface or partial surface of the stop portion is provided with the first friction face and the second friction face which are formed by the laser process, including peeling, coloring, concentration, or carbonization;
each of the first friction face and the second friction face is a rough surface with particles;
the first friction face and the second friction face increase a contact friction force between the stop portion and the workpiece to prevent the workpiece from slipping from the stop portion;
the first laser body and the second laser body are provided on the stop portion and formed with the first friction face and the second friction face;
the first friction face covers at least one third of the first surface;
the second friction face covers at least one third of the second surface;
when the first friction face is provided on the first surface, the first laser body includes multiple first friction faces, and the first friction faces are distributed on the first surface;
when the second friction face is provided on the second surface, the second laser body includes multiple second friction faces, and the second friction faces are distributed on the second surface;
when the first friction face is provided on the first surface, the first laser body includes multiple first friction faces, and the first friction faces are arranged obliquely relative to the stop portion;
an angle of ten degrees to seventy degrees is defined between each of the first friction faces and a side of the stop portion;
the angle has an optimum value of forty-five degrees;
when the second friction face is provided on the second surface the second laser body includes multiple second friction faces, and the second friction faces are arranged obliquely relative to the stop portion;
an angle of ten degrees to seventy degrees is defined between each of the second friction faces and a side of the stop portion;
the angle has an optimum value of forty-five degrees;
the first friction faces are arranged linearly relative to the stop portion;
the first friction faces and the stop portion are parallel with each other; and
the first friction faces are arranged transversely relative to the stop portion.

2. The tape structure as claimed in claim 1, wherein the first body is a tape measure.

3. The tape structure as claimed in claim 1, wherein:
the grooves are arranged linearly or annularly or in a dotted shape;
the stop portion is provided with at least one slot;
the at least one slot penetrates the first surface and the second surface; and
the at least one slot has an elongate shape.

4. The tape structure as claimed in claim 1, further comprising:
a second body having an interior provided with a receiving space for receiving the first body;
wherein:
the stop portion is moved to rest on a side of the second body;
the stop portion protrudes from the second body; and
the first body is pulled outward from or retracted into the second body.

5. The tape structure as claimed in claim 1, wherein first body is a rewindable resilient tape structure, including a tape, a cloth tape, a ruler or the like.

6. The tape structure as claimed in claim 1, wherein second surface is provided with multiple grooves.

7. The tape structure as claimed in claim 1, wherein:
the first laser body is provided with colors, patterns, stripes, grains, trademarks, characters or figures, to enhance identification of the stop portion;
the second laser body is also provided with colors, patterns, stripes, grains, trademarks, characters or figures, to enhance identification of the stop portion; and
the first laser body and the second laser body are made by a machine that presets a path of the first laser body and the second laser body so that the first laser body and the second laser body are provided with various figures.

* * * * *